(12) United States Patent
Vipat et al.

(10) Patent No.: US 9,171,146 B2
(45) Date of Patent: Oct. 27, 2015

(54) METHOD AND SYSTEM FOR MONITORING CALLS TO AN APPLICATION PROGRAM INTERFACE (API) FUNCTION

(75) Inventors: Harshawardhan Vipat, San Jose, CA (US); Ravi Sahita, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 213 days.

(21) Appl. No.: 13/997,739

(22) PCT Filed: Dec. 14, 2011

(86) PCT No.: PCT/US2011/064817
§ 371 (c)(1),
(2), (4) Date: Jun. 25, 2013

(87) PCT Pub. No.: WO2013/089695
PCT Pub. Date: Jun. 20, 2013

(65) Prior Publication Data
US 2013/0283370 A1  Oct. 24, 2013

(51) Int. Cl.
| | |
|---|---|
| *G06F 11/00* | (2006.01) |
| *G06F 21/44* | (2013.01) |
| *G06F 11/30* | (2006.01) |
| *G06F 21/55* | (2013.01) |
| *G06F 21/56* | (2013.01) |
| *G06F 9/455* | (2006.01) |

(52) U.S. Cl.
CPC ............ *G06F 21/44* (2013.01); *G06F 9/45558* (2013.01); *G06F 11/302* (2013.01); *G06F 11/3093* (2013.01); *G06F 21/554* (2013.01); *G06F 21/56* (2013.01); *G06F 2009/45587* (2013.01); *G06F 2201/815* (2013.01); *G06F 2201/865* (2013.01)

(58) Field of Classification Search
CPC ........ G06F 21/44; G06F 21/56; G06F 21/554
USPC .......................................................... 726/22
See application file for complete search history.

(56) References Cited

U.S. PATENT DOCUMENTS

| | | | |
|---|---|---|---|
| 7,886,126 | B2 | 2/2011 | Bennett et al. |
| 8,650,642 | B2 * | 2/2014 | Sallam ............................ 726/23 |
| 2007/0050848 | A1 * | 3/2007 | Khalid ............................ 726/24 |
| 2008/0016339 | A1 * | 1/2008 | Shukla .......................... 713/164 |

(Continued)

FOREIGN PATENT DOCUMENTS

WO  2013089695 A1  6/2013

OTHER PUBLICATIONS

Kim, "Intercepting System API Calls," Intel Software Network, Intel Corporation, available: [http://software.intel.com/en-us/articles/intercepting-system-api-calls], Aug. 20, 2009, 10 pages.

(Continued)

*Primary Examiner* — Teshome Hailu
(74) *Attorney, Agent, or Firm* — Barnes & Thornburg LLP (57) ABSTRACT

A method and device for monitoring calls to an application program interface (API) function includes monitoring for a memory permission violation of a computing device caused by the API function call. If a memory permission violation occurs, control of the computing device is transferred to a virtual machine monitor to intervene prior to execution of the API function. The virtual machine monitor may perform one or more actions in response to the API function call.

13 Claims, 5 Drawing Sheets

(56) References Cited

U.S. PATENT DOCUMENTS

| | | | | |
|---|---|---|---|---|
| 2010/0106926 | A1* | 4/2010 | Kandasamy et al. | 711/163 |
| 2011/0078361 | A1* | 3/2011 | Chen et al. | 711/6 |
| 2012/0254995 | A1* | 10/2012 | Sallam | 726/22 |
| 2012/0255000 | A1* | 10/2012 | Sallam | 726/23 |
| 2013/0312098 | A1* | 11/2013 | Kapoor et al. | 726/24 |

OTHER PUBLICATIONS

Gillespie, "Best Practices for Paravirtualization Enhancements from Intel Virtualization Technology: EPT and VT-d," Intel Software Network, Intel Corporation, available: [http://software.intel.com/en-us/articles/best-practices-for-paravirtualization-enhancements-from-intel-virtualization-technology-ept-and-vt-d/], Jun. 1, 2009, 3 pages.

"x86 virtualization," Wikipedia, The Free Encyclopedia, available: [http://en.wikipedia.org/w/index.php?title=X86_virtualization&oldid=457130891], accessed Oct. 28, 2011, 5 pages.

"Hooking," Wikipedia, The Free Encyclopedia, available: [http://en.wikipedia.org/w/index.php?title=Hooking&oldid=456382481], accessed Oct. 28, 2011, 11 pages.

PCT International Search Report and Written Opinion received for International Patent Application No. PCT/US2011/064817, mailed Jul. 30, 2012, 9 pages.

\* cited by examiner

METHOD AND SYSTEM FOR MONITORING CALLS TO AN APPLICATION PROGRAM INTERFACE (API) FUNCTION

BACKGROUND

Modern computing devices, such as laptops, smartphones, mobile Internet devices (MIDs), and tablets are becoming ubiquitous with everyday life, so much so that the reliability of such devices is becoming increasingly important. The detection and prevention of computer worms, viruses, and other types or malware is an essential aspect to ensuring the reliability of a computing device. However, as malware becomes more sophisticated, detecting and preventing malware has become increasingly difficult.

Traditionally, detection and prevention of malware on a computing device is performed by anti-malware software executing on the computing device. Often, such software is designed to operate in connection with a specific operating system or kernel. That is, conventional anti-malware software is not typically designed to work universally across disparate operating systems. Additionally, traditional anti-malware solutions are typically solely software-based solutions, which require a growing amount of resources of the computing device, especially in light of the increasing sophistication of malware.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions stored on one or more non-transitory, machine-readable media, which may be read and executed by one or more processors. A non-transitory, machine-readable medium may include any non-transitory mechanism for storing or transmitting information in a form readable by a machine (e.g., a computing device). For example, a non-transitory, machine-readable medium may include any one or combination of read only memory (ROM); random access memory (RAM); magnetic disk storage media; optical storage media; flash memory devices; and others.

Figure 1:
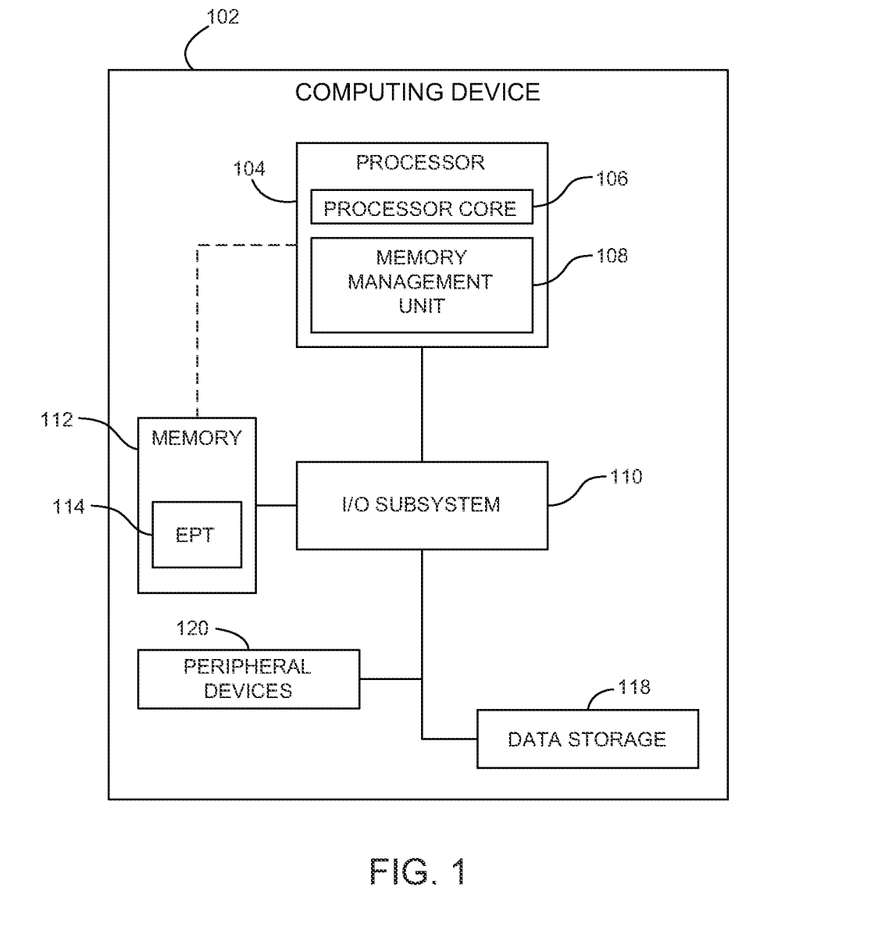
FIG. 1 is a simplified block diagram of at least one embodiment of a computing device for monitoring calls to application programming interface functions.

Referring now to FIG. 1, a computing device 102 is configure to monitor calls to a system application programming interface (API) function to determine, for example, whether such calls were made to carry out a malicious activity on the computing device, or whether they were made for a legitimate reason. To do so, as discussed in more detail below, memory permissions associated with a memory page on which the monitored API function is located are set to cause a memory permission violation in response to the API function call. As such, when the monitored API function is called by a process executed on the computing device 102, the memory permission violation is generated and control is transferred to an agent executing on the computing device 102 to investigate the API function call further. In this way, the computing device 102 may make a determination whether the API function call was made to carry out a malicious activity. If so, the computing device 102 may prevent execution of the API function and/or perform additional security operations. If not, the computing device 102 may allow execution of the API function.

The computing device 102 may be embodied as any type of computing device capable of performing the functions described herein. For example, the computing device 102 may be embodied as a desktop computer, a laptop computer, a mobile internet device, a handheld computer, a smart phone, a personal digital assistant, a telephony device, or other computing device. In the illustrative embodiment of FIG. 1, the computing device 102 includes a processor 104, an I/O subsystem 110, a memory 112, a data storage device 118, and one or more peripheral devices 120. In some embodiments, several of the foregoing components may be incorporated on a motherboard of the computing device 102, while other components may be communicatively coupled to the motherboard via, for example, a peripheral port. Furthermore, it should be appreciated that the computing device 102 may include other components, sub-components and devices commonly found in a computer and/or computing device, which are not illustrated in FIG. 1 for clarity of the description.

The processor 104 of the computing device 101 may be embodied as any type of processor capable of executing software/firmware, such as a microprocessor, digital signal processor, microcontroller, or the like. The processor 104 is illustratively embodied as a single core processor having a processor core 106. However, in other embodiments, the processor 104 may be embodied as a multi-core processor having multiple processor cores 106. Additionally, the computing device 102 may include additional processors 104 having one or more processor cores 106.

The processor 104 may also include a memory management unit 108 to control memory functions. In the illustrative embodiment, the memory management unit 108 includes hardware and/or firmware components that facilitate or otherwise assist in the virtualization of computing environments. For example, the memory management unit 108 facilitates the use of extended page tables (EPTs) 114, which provide memory virtualization for virtual partitions that may be established on the computing device 102 as discussed in more detail below. The EPTs 114 provide additional memory permissions to be set for each memory page. As discussed below, those additional memory permissions are used to control the use of the monitored API function.

The I/O subsystem 110 of the computing device 102 may be embodied as circuitry and/or components to facilitate input/output operations with the processor 104 and/or other components of the computing device 102. In some embodiments, the I/O subsystem 110 may be embodied as a memory controller hub (MCH or "northbridge"), an input/output controller hub (ICH or "southbridge"), and a firmware device. In such embodiments, the firmware device of the I/O subsystem 110 may be embodied as a memory device for storing Basic Input/Output System (BIOS) data and/or instructions and/or other information (e.g., a BIOS driver used during booting of the computing device 102). However, in other embodiments, I/O subsystems having other configurations may be used. For example, in some embodiments, the I/O subsystem 110 may be embodied as a platform controller hub (PCH). In such embodiments, the memory controller hub (MCH) may be incorporated in or otherwise associated with the processor 104, and the processor 104 may communicate directly with the memory 112 (as shown by the hashed line in FIG. 1). Additionally, in other embodiments, the I/O subsystem 110 may form a portion of a system-on-a-chip (SoC) and be incorporated, along with the processor 104 and other components of the computing device 102, on a single integrated circuit chip.

The processor 104 is communicatively coupled to the I/O subsystem 110 via a number of signal paths. These signal paths (and other signal paths illustrated in FIG. 1) may be embodied as any type of signal paths capable of facilitating communication between the components of the computing device 102. For example, the signal paths may be embodied as any number of wires, cables, light guides, printed circuit board traces, via, bus, intervening devices, and/or the like.

The memory 112 of the computing device 102 may be embodied as or otherwise include one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The memory 112 is communicatively coupled to the I/O subsystem 110 via a number of signal paths. Although only a single memory device 112 is illustrated in FIG. 1, the computing device 102 may include additional memory devices in other embodiments. Various data and software may be stored in the memory device 112. For example, one or more operating systems, applications, programs, libraries, and drivers that make up the software stack executed by the processor 104 may reside in memory 112 during execution. Furthermore, software and data stored in memory 112 may be swapped between the memory 112 and the data storage 118 as part of memory management operations.

Additionally, as discussed above, one or more extended page tables (EPTs) 114 may be implemented the computing device 102. The EPTs 114 may be stored in an addressable location of the memory 112 and utilized to facilitate virtualization of the computing device 102. As discussed in more detail below, an EPT 114 allows a virtual machine monitor (VMM) of the computing device 102 to specify additional memory permissions for one or more memory pages stored in the memory 112.

The peripheral devices 120 of the computing device 102 may include any number of peripheral or interface devices. For example, the peripheral devices 120 may include a display, a touch screen, a keyboard, a mouse, external speakers, and/or other peripheral devices. Additionally, the peripheral devices 120 may include communication circuitry to facilitate communication with one or more remote computing devices over a network. The computing device 102 may use any suitable communication protocol to communicate with other computing devices over the network depending on, for example, the particular type of network(s). The peripheral devices 120 of the computing device also include data storage device(s) 118. The data storage device(s) 118 may be embodied as any type of device or devices configures for the short-term or long-term storage of data such as, for example, memory devices and circuits, memory cards, hard disk drives, solid-state drives, or other data storage devices. The particular devices included in the peripheral devices 120 may depend upon, for example, the intended use of the computing device 102. The peripheral devices 120 are communicatively coupled to the I/O subsystem 110 via a number of signal paths thereby allowing the I/O subsystem 110 and/or processor 104 to receive inputs from and send outputs to the peripheral devices 120.

Figure 2:
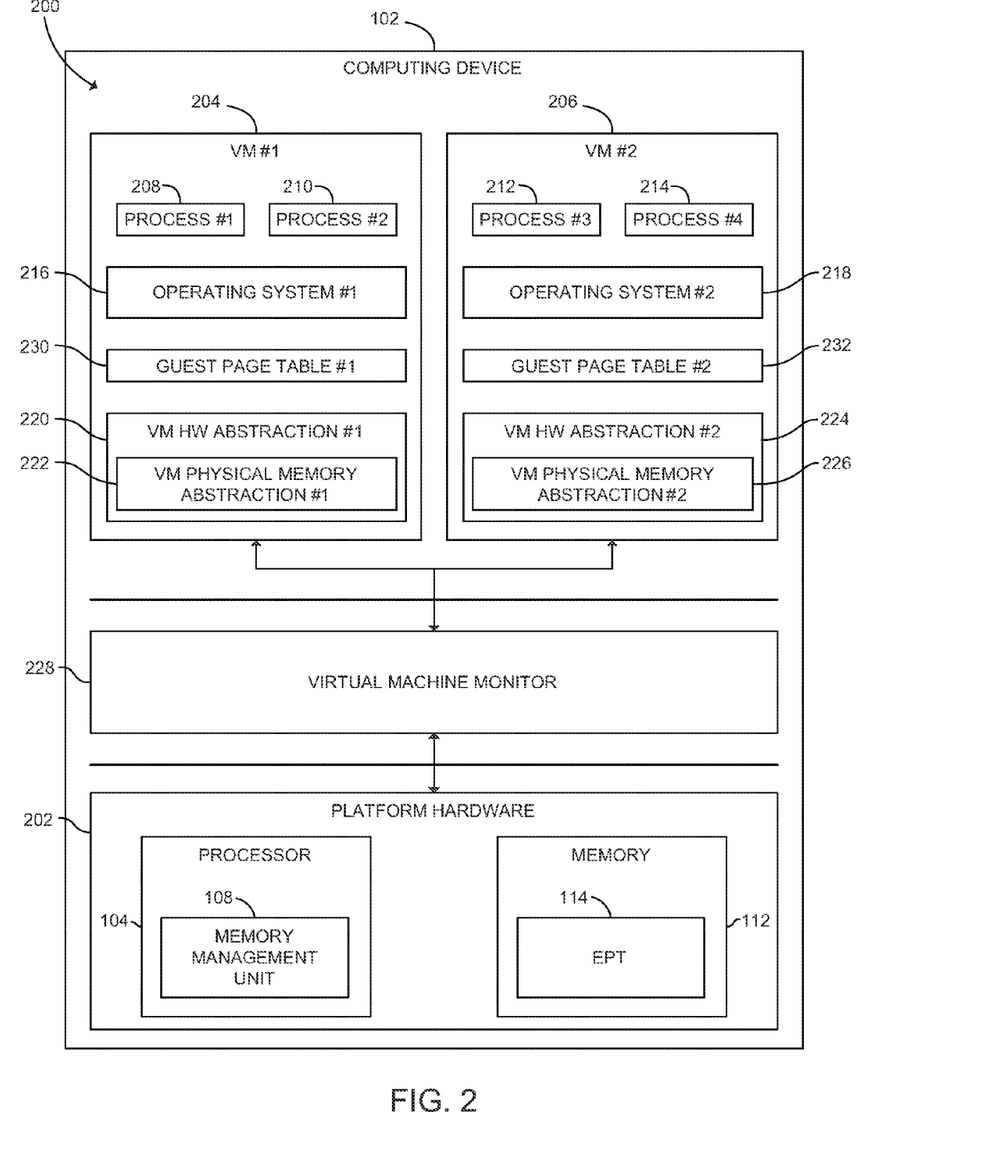
FIG. 2 is a simplified block diagram of at least one embodiment of a virtualized environment of the computing device of FIG. 1.

Referring now to FIG. 2, in some embodiments a virtualized software execution environment 200 is established on the computing device 102 to monitor for maliciously intended API function calls. As shown in FIG. 2, the computing device 102 includes platform hardware 202, which includes the processor 104 and the memory 112 discussed above. Of course, it should be appreciated that the platform hardware 202 may include a number of additional structures and devices of the computing device 102, which are not shown in FIG. 2 for clarity of the description.

The illustrative virtualized software execution environment 200 is implemented on the platform hardware 202 of the computing device 102. The software execution environment 200 includes a virtual machine monitor (VMM) or hypervisor 228, which is a privileged software component that facilitates and manages the virtualization of the platform hardware 202 to allow multiple guest operating systems and/or other applications to execute concurrently on the computing device 102. In the illustrative embodiment, the VMM 228 is executed in a privileged or root mode of the computing device 102 and has substantially full control of the hardware resources of the computing device 102.

The software execution environment 200 also includes one or more virtual machines (VMs) 204, 206, which are executed as a guest on the VMM 228. That is, the VMs 204, 206 are executed in a non-privileged or non-root mode. Each of the VMs 204, 206 may execute an operating system (OS) 216, 218, respectively. The VMs 204, 206 may execute the same or a different OS 216, 218. For example, the OS 216 may be a WINDOWS OS, which is commercially available from Microsoft Corporation of Redmond, Wash., whereas the OS 218 may be a LINUX OS, which is commercially available from one of a number of vendors such as Red Hat of Raleigh, N.C. Each of the OSs 216, 218 may execute one or more processes 208, 210, 212, 214. Each of the processes 208, 210, 212, 214 may be similar or different based on the respective type of the OS 216, 218, the intended use of the respective VM 204, 206, and/or other criteria. It should be appreciated that although only two VMs 204, 206 are illustrated in FIG. 2, the virtualized environment 200 may include greater or fewer VMs in other embodiments.

The VMM 228 translates operations of each OS 216, 218 to provide a level of abstraction between each OS 216, 218 and the platform hardware 202. In doing so, the VMM 228 may provide each OS 216, 218 operating in each VM 204, 206 with a hardware abstraction 222, 224 of some or all of the components of the platform hardware 202. For example, the VMM 228 may virtualize the processor 104 of the platform hardware 202 for each of the VMs 204, 206. In some embodiments, the VMM 228 may also virtualize the physical memory 112 of the platform hardware 202 to provide an abstraction 222, 226 of the memory 112 for each of the VMs 204, 206.

As discussed above, the processor 104 includes the memory management unit 108 to facilitate the virtualization of computing environments and implement the one or more EPTs 114 on the computing device 102. In operation, the VMM 228 may maintain an EPT 114, which may be utilized to map guest-physical addresses of the VMs 204, 206 to host-physical addresses of the physical platform memory 112. Additionally, while the applications (e.g., the OSs 216, 218) are executing on the associated VMs 204, 206 in the non-privileged mode, certain instructions, processor events, and/or errors may trigger a hardware assisted transition to the privileged mode (i.e., the memory management unit 108 may assist in the transition) to allow the VMM 228 to respond to such events.

As discussed above, the virtualized software execution environment 200 may be established on the compacting device 102 to monitor for maliciously intended attempts to execute the monitored API function. If the computing device 102 detects that an execution attempt has occurred, the computing device 102 may determine whether the attempt violates a memory permission. To facilitate such functionality, the VMM 228 may set a memory permission of the EPT 114 associated with the memory pages(s) containing the monitored API function. Specifically, the memory permission is selected or otherwise set such that the attempted execution of the monitored API function results in a memory permission violation. It should be appreciated that the memory permission may be enforced by the hardware of the computing device 102 in a hardware independent fashion. For example, in one embodiment, a memory permission associated with the memory page(s) containing the monitored API function is set to indicate that the memory page(s) does not include executable code. As such, the attempted execution of the monitored API function, which has been identified as being non-executable, generates a memory permission violation.

For example, during operation of the computing device 102, one or more of the processes 208, 210, 212, 214 may invoke a monitored API and attempt to execute a corresponding API function (e.g., CreateFile). The guest-physical address of the monitored API function may be determined using a guest page table 230, 232 (GPT) of the VM 204, 206 that invoked the monitored API. The GPT 230, 232 may be used to translate and/or map a guest-virtual address of the monitored API function to the corresponding guest-physical address on the VM 204, 206. Thereafter, the EPT 114 may be used to translate and/or map the guest-physical address of the monitored API function to the corresponding host-physical address of the monitored API function. In such embodiments, the host-physical address may point to the actual location of the monitored API in the physical memory 112 of the computing device 102. The computing device 102 may also determine whether the EPT 114 contains a memory permission that prevents execution of the monitored API function (e.g., CreateFile) or otherwise generates a memory violation in response to the attempted execution. If the computing device 102 determines that the EPT 114 includes such a memory permission, the computing device 102 may determine whether the execution of the monitored API function (e.g., CreateFile) violates the associated memory permission of the computing device 102.

In some embodiments, in response to determining that a violation of a memory permission of the computing device 102 has not occurred, the computing device 102 may allow the process 208, 210, 212, 214 to execute the monitored API function. If, on the other hand, the computing device 102 determines that a violation of the permission has occurred, the computing device 102 may transfer control from the non-privileged mode to the VMM 228 executed in the privileged mode to provide the VMM 228 with an opportunity to intervene and/or instigate further actions. For example, in some embodiments, the VMM 228 may save a platform context. Additionally or alternatively, the VMM 228 may invoke an error handler to perform one or more additional functions in response to the monitored API function call.

For example, in some embodiments, the computing device 102 may, in response to determining that a violation of a memory permission has occurred, further determine whether the API function call was made to carry out a malicious activity or whether it was made for legitimate purposes. For example, the computing device 102 may determine that the API function call is made to carry out a malicious activity based on a predefined set of rules, security policies, heuristics, and/or one or more behavioral patterns associated with known malware. If the computing device 102 determines that the API function call is not made to carry out a malicious activity (e.g., the API function call was made for legitimate reasons), the computing device 102 may allow the process 208, 210, 212, 214 to execute the corresponding API function. If, on the other hand, the computing device 102 determines that the API function call is made to carry out a malicious activity, the computing device 102 may prevent the process 208, 210, 212, 214 from executing the monitored API function. In some embodiments, the computing device 102 may, in addition to preventing execution of the associated API function, perform one or more additional security functions. For example, the computing device 102 may save the context of the maliciously intended API function call to a log for further analysis, trigger an OS-specific malware monitoring agent to further process the event, present a warning message on a display of the computing device 102 to inform a user or administrator of the computing device 102 of the maliciously intended API function call, and/or perform any other appropriate response to determining that a API function call is maliciously made.

Figure 3:
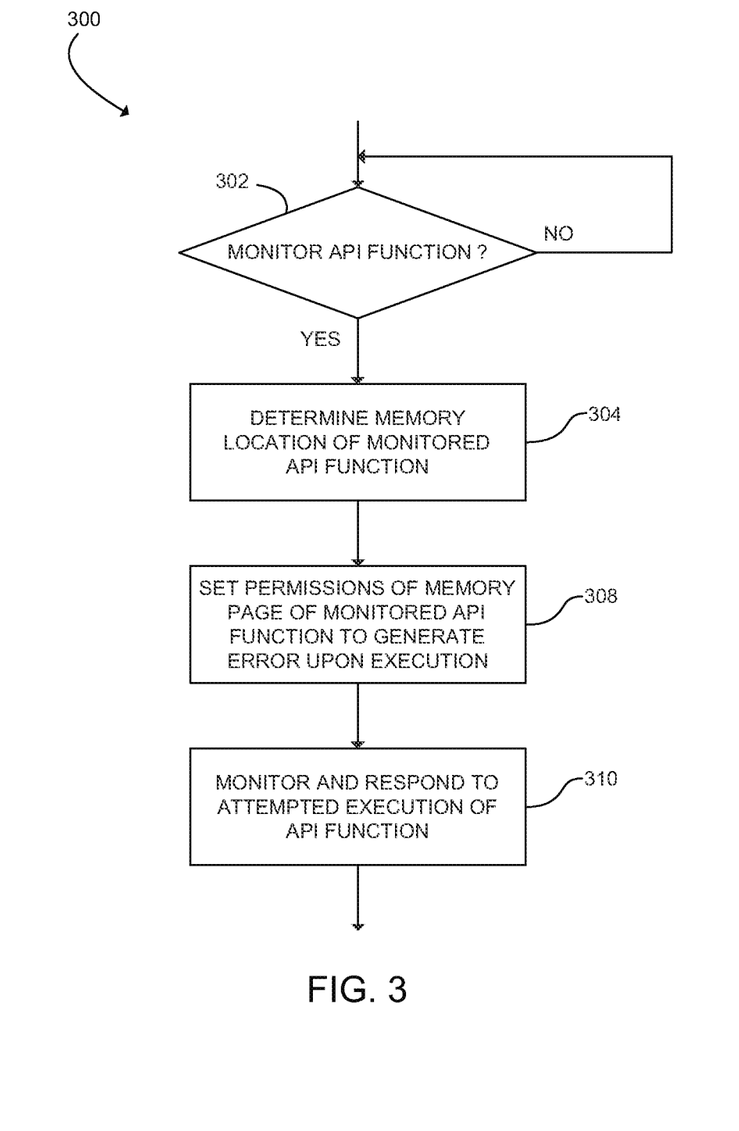
FIG. 3 is a simplified flow diagram of at least one embodiment of a method for configuring the computing device of FIG. 1 for the monitoring of calls to application programming interface functions.

Referring now to FIG. 3, a method 300 for configuring the computing device 102 to monitor calls to a monitored API function begins with block 302. In block 302, the computing device 102 determines whether monitoring of one or more API functions is desired. If so, the method 300 advances to block 304 in which the computing device 102 determines a memory location of the API function to be monitored. For example, the computing device 102 identifies the one or more memory pages containing the API function. Additionally, the computing device 102 identifies the one or more corresponding entries in the EPT 114 corresponding to the memory page(s) containing the monitored API function.

In block 308, the computing device 102 sets a memory permission of the EPT 114 associated with the identified memory page(s) containing the API function. For example, the computing device 102 may set a memory permission associated with the corresponding memory page(s) in the EPT 114 that causes an error in response to or otherwise prevents execution of the particular monitored API function. For example, in one particular embodiment, a memory permission indicating that the memory page(s) containing the API function include non-executable code may be set in block 308.

In block 310, the computing device 102 may subsequently monitor attempted executions of monitored API functions. For example, as discussed in more detail below with regard to FIG. 4, the computing device 102, may determine whether an attempted execution of a monitored API function violates the memory permission associated with the memory page(s) containing the monitored API function. If so, the computing device 102 may transition to the privileged mode to determine whether the API function call is made to perform a malicious activity. If the computing device 102 determines that the attempted execution of the monitored API function is made to perform a malicious activity, the computing device 102 may prevent execution of the API function and/or perform additional security measures.

Figure 4:
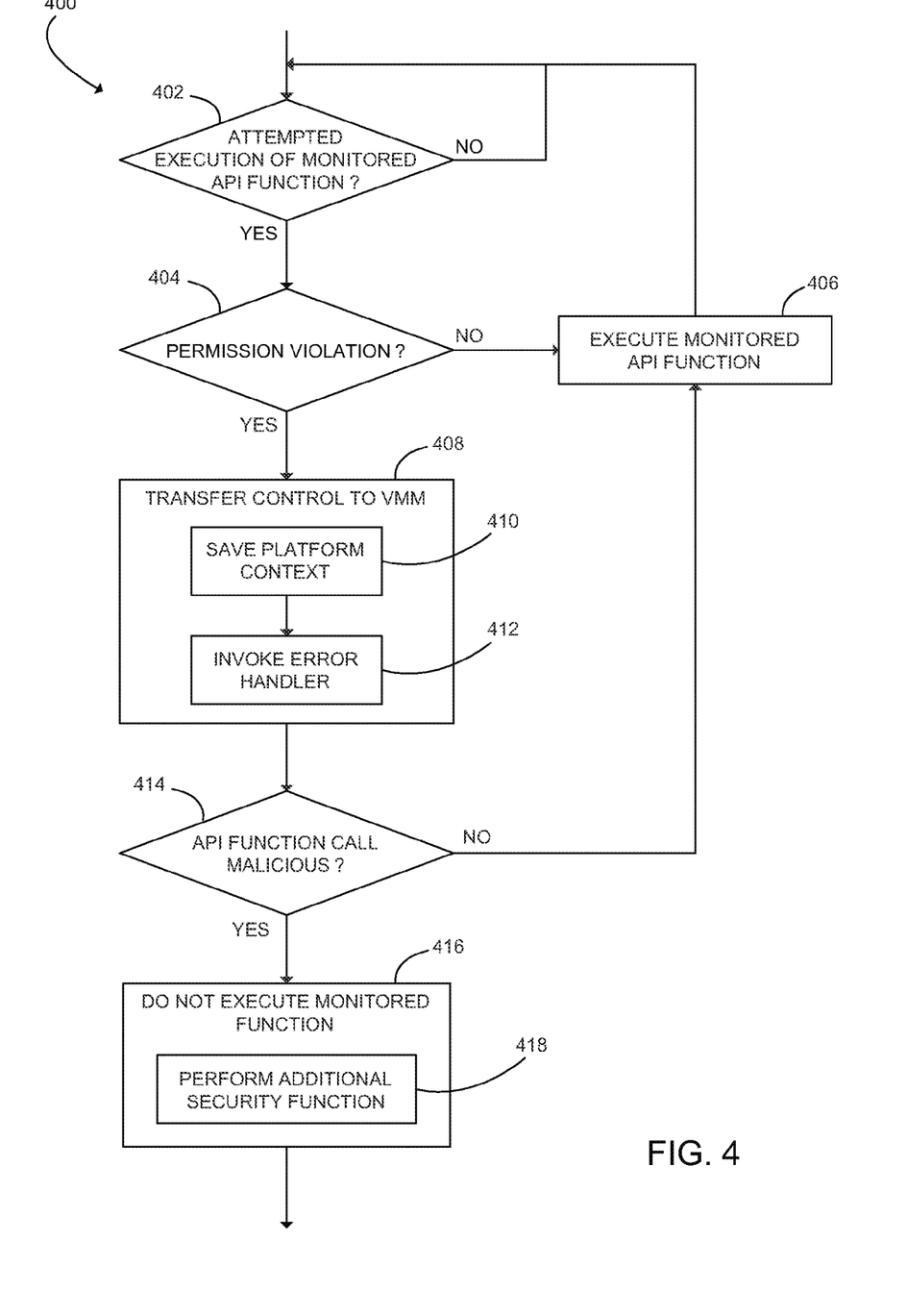
FIG. 4 is a simplified flow diagram of at least one embodiment of a method for monitoring calls to application programming interface functions.

Referring now to FIG. 4, one illustrative embodiment of a method 400 for monitoring a system call for an attempted execution of a monitored API function, which may be performed by the computing device 102, begins with block 402. In block 402, the computing device 102 determines whether execution of a monitored API function is attempted. As discussed above, the one or more processes 208, 210, 212, 214 may attempt to execute an API function that is monitored by the computing device 102.

If the computing device 102 determines in block 402 that execution of the monitored API function is attempted, the method 400 advances to block 404. In block 404, the computing device 102 determines whether execution of the monitored API function violates a memory permission of the computing device 102. That is, the computing device 102 determines whether a memory violation has occurred in response to the attempted execution of the monitored API function. As discussed above, the memory permission may be specified by the VMM 228 using the EPT 114 to cause a memory permission violation event in response to the attempted execution of the monitored API functions (e.g., the memory permission may indicate that the associated memory page is non-executable).

If the computing device 102 determines in block 404 that execution of the monitored API function does not violate a memory permission, the method 400 advances to block 406 in which the monitored API function is executed. Upon execution of the monitored API function in block 406, the method 400 may restart. If, however, the computing device 102 determines in block 404 that execution of the monitored API function violates a memory permission of the computing device 102, the computing device 102 generates a memory permission violation or error, and the method 400 advances to block 408 in which control is transferred from the non privileged mode to the privileged mode in which the VMM 228 is executed.

In some embodiments, the VMM 228 may be configured to perform certain functions upon or in response to the control transfer. For example, the VMM 228 may save a context of the computing device 102 upon the control transfer in block 410. Additionally, the VMM 228 may invoke an error handler to analyze and respond to the attempted execution of the monitored API function. Further, the VMM 228 may perform other functions or actions to allow the VMM 228 to intervene, analyze, and/or respond to the memory permission violation as discussed below.

In block 414, the VMM 228 determines whether the attempted execution of the monitored API function is made to perform a malicious action. The VMM 228 (or the invoked error handler) may use any suitable algorithm, data, or functions to determine whether the attempted API function call is made to perform a malicious action. If the VMM 228 determines in block 414 that execution of the monitored API function is not made to perform a malicious action, the method 400 advances to block 406 in which the monitored API function is executed.

If, however, the VMM 228 determines that execution of the monitored API function is made to perform a malicious action, the method 400 advances to block 416. In block 416, the VMM 228 (or invoked error handler) may prevent the one or more processes 408, 410, 412, 414 from executing the monitored API function. Additionally, as discussed above, the VMM 228 (or invoked error handler) may perform additional security functions in response to the maliciously intended API function call. For example, the computing device 102 may save the context of the maliciously intended API function call to a log for further analysis, trigger an OS-specific malware monitoring agent to further process the event, present a warning message on a display of the computing device 102 to inform a user or administrator of the computing device 102 of the maliciously intended API function call, and/or perform any other appropriate response to determining that a API function call is maliciously made.

Figure 5:
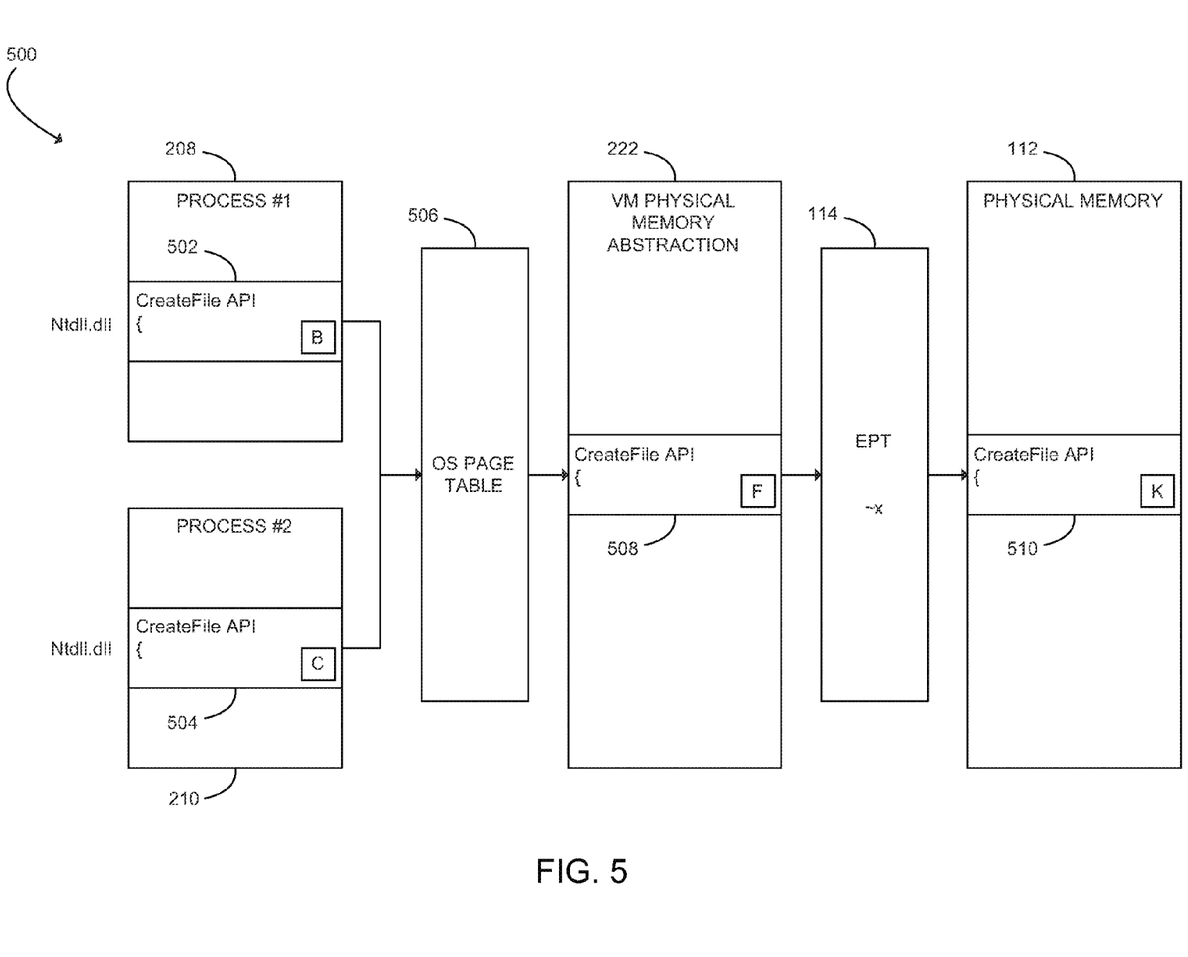
FIG. 5 is a simplified block diagram of at least one embodiment of a process for monitoring an attempt to execute an application programming interface function on the computing device of FIG. 1.

Referring now to FIG. 5, one illustrative embodiment of a process flow of the computing device 102 while monitoring for an attempt to execute the monitored API function is shown. In the illustrated example process flow, the processes 208, 210 of the VM 204 attempt to execute the monitored API function. For example, the processes 208, 210 may attempt to execute a CreateFile API function 502, 504. Although the CreateFile API functions 502, 504 appear to the calling processes 208, 210 as being stored in one or more memory pages B, C or local virtualized memory, the CreateFile API functions 502, 504 actually correspond to a CreateFile API 510 that is stored in a memory page K of the physical memory 112 of the computing device 102. Such physical memory location is not typically known by the calling processes 208, 210. As such, the virtual memory location of the CreateFile API functions 502, 504 are translated to the physical memory location of the CreateFile API 510. As discussed below, the OS 216 of the VM 204 establishes an OS page table 506 (e.g., the OPT 230, 232) and the VMM 228 establishes the EPT 114 to facilitate such translations.

The OS page table 506 is utilized to translate the one or more guest-virtual addresses of memory pages of the virtual memory to one or more guest-physical addresses of memory pages of the physical memory abstraction 222 of the VM 204. For example, the OS page table 506 is utilized to translate the guest-virtual address of the memory pages B, C containing the CreateFile API 502, 504 in the virtual memory to a guest-physical address of a memory page F containing a corresponding CreateFile API 508 in the physical memory abstraction 222.

The EPT 114 is utilized to translate one or more guest-physical addresses of memory pages of the physical memory abstraction 222 to one or more host-physical addresses of memory pages of the physical memory 112 of the computing device 102. For example, the EPT 114 is utilized to translate the guest-physical address of the memory page F containing the CreateFile API 508 in the physical memory abstraction 222 of the VM 204 to a host-physical address of the memory page K containing the corresponding CreateFile API 510 in the physical memory 112 of the computing device 102.

Additionally, as discussed above, the EPT 114 includes one or more memory permissions associated with the memory page containing the CreateFile API 510, which is set to prevent execution of the CreateFile API function 510. For example, the memory permission (e.g., ~x) may be set to indicate that the memory page(s) containing the CreateFile API function 510 includes non-executable code. Of course, it should be appreciated that other memory permissions for other API functions may be used in other embodiments. For example, memory permissions other than the non-executable memory permission discussed above may be used to generate the memory permission violation. Additionally, API functions other than the CreateFile function discussed above may be monitored in other embodiments.

It should be appreciated that the illustrative embodiments shown and described above can be utilized to monitor the actions of each process 208, 210, 214, 214 executing on the computing device 102. That is, embodiments described above enable monitoring API function calls in an OS-independent fashion. As such, the embodiments described herein may eliminate the need to separately modify each monitored process and/or the need for in-memory modifications of the user space code and/or kernel space code.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

The invention claimed is:

1. A computing device comprising:
a processor; and
a memory having stored therein a plurality of instructions that, in response to being executed by the processor, causes the processor to:
set a memory permission of an extended page table (EPT) to cause an error in response to an attempted execution of a monitored application programming interface (API) function located in a memory page associated with the EPT;
generate an EPT permission violation error in response to the attempted execution of the monitored API function;
transfer control to a virtual machine monitor (VMM) of the computing device in response to the EPT permission violation error;
invoke an error handler with the VMM to (i) determine whether the call to the monitored API function is made to perform a malicious activity on the computing device and (ii) prevent execution of the monitored API function in response to a determination that the call to the monitored API function is made to perform the malicious activity on the computing device.

2. The computing device of claim 1, wherein the memory permission indicates that the memory page includes non-executable code.

3. The computing device of claim 1, wherein the instructions further cause the error handler to allow execution of the monitored API function in response to a determination that the call to the monitored API function is not made to perform the malicious activity on the computing device.

4. The computing device of claim 1, wherein the instructions further cause the processor to save a platform context with the VMM in response to a determination that the call to the monitored API function violates the memory permission.

5. At least one non-transitory, machine readable media comprising a plurality of instructions, which in response to execution by a computing device, cause the computing device to:
establish a memory permission in an extended page table (EPT) associated with a memory page including a monitored application programming interface (API) function, the memory permission selected to cause the generation of a-memory permission violation error in response to an attempted execution of the monitored API function;
generate the memory permission violation error in response to the attempted execution of the monitored API function; and
transfer control from an operating system of the computing device to a virtual machine monitor (VMM) of the computing device to in response to the memory permission violation error;
invoke, by the VMM, an error handler to (i) determine whether the call to the monitored API function is made to perform a malicious activity on the computer device and (ii) prevent execution of the monitored API function in response to a determination that the call to the monitored API function is made to perform the malicious activity on the computer.

6. The at least one non-transitory, machine readable media of claim 5, wherein to generate the memory permission violation comprises to generate an EPT permission violation error in response to the attempted execution of the monitored API function.

7. The at least one non-transitory, machine readable media of claim 5, wherein the plurality of instructions further cause the error handler to allow execution of the monitored API function in response to a determination that the call to the monitored API function is not made to perform the malicious activity on the computing device.

8. A method comprising:

establishing, on a computing device, a memory permission in an extended page table (EPT) associated with a memory page including a monitored application programming interface (API) function, the memory permission to cause the generation of an error in response to an attempted execution of the monitored API function;

generating, on the computing device, a memory permission violation error in response to an attempted execution of the monitored API function;

transferring, on the computing device, control to a virtual machine monitor (VMM) of the computing device in response to the memory permission violation error;

invoking, by the VMM, an error handler to determine whether the attempted execution of the monitored API function is made to perform a malicious activity; and preventing, by the error handler, execution of the monitored API function in response to determining that the attempted execution of the monitored API function is made to perform the malicious activity.

9. The method of claim 8, wherein establishing a memory permission comprises setting a memory permission in the EPT that identifies the memory page as having non-executable code.

10. The method of claim 8, wherein generating a memory permission violation error comprises generating an EPT permission violation error in response to the attempted execution of the monitored API function.

11. The method of claim 8, wherein transferring control to the VMM comprises transferring control to the VMM from at least one process executed on the computing device in response to the memory permission violation error.

12. The method of claim 8, wherein invoking an error handler with the VMM comprises invoking an error handler of an operating system executing on the computing device to manage the memory permission violation error.

13. The method of claim 8, further comprising allowing, by the error handler, execution of the monitored API function in response to determining that the attempted execution of the monitored API function is not made to perform the malicious activity.

* * * * *